(No Model.) 2 Sheets—Sheet 1.

J. B. MITCHELL.
LABEL HOLDER.

No. 362,849. Patented May 10, 1887.

Witnesses:

Inventor:
John B. Mitchell
By his Atty.
Herbert G. Briggs (No Model.) 2 Sheets—Sheet 2.

J. B. MITCHELL.
LABEL HOLDER.

No. 362,849. Patented May 10, 1887.

Witnesses:
Fred J. Ilsley
Edwin A. Boothby

Inventor.
John B. Mitchell
By his atty
Herbert G. Briggs

UNITED STATES PATENT OFFICE.

JOHN B. MITCHELL, OF PORTLAND, MAINE.

LABEL-HOLDER.

SPECIFICATION forming part of Letters Patent No. 362,849, dated May 10, 1887.

Application filed August 21, 1885. Serial No. 174,949. (No model.)

*To all whom it may concern:*

Be it known that I, JOHN B. MITCHELL, residing at Portland, in the county of Cumberland and State of Maine, have invented certain new and useful Improvements in Route-Indicators; and I do hereby declare that the following is a full, clear, and exact description of the invention, which will enable others skilled in the art to which it appertains to make and use the same.

Figure 1:
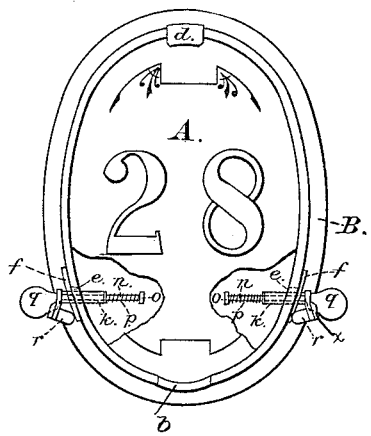
Figure 2:
Figure 3:
Figure 4:
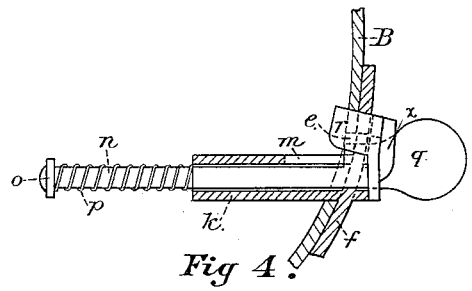
Figure 7:
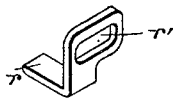
Figure 8:
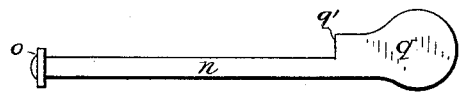
Figure 5:
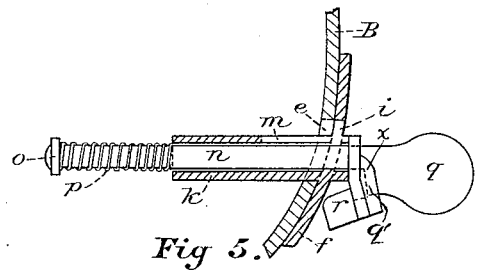
Figure 6:
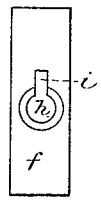

Figure 1 is a plan view of my newly-organized back plate and frame for holding route-indicating signs, said plate and frame being partially broken away to show the devices for locking the indicating-signs in place. Fig. 2 is a plan view of the same with a route-indicating sign in place. Fig. 3 is the same view, showing the reverse side of the sign exhibited in Fig. 2. Figs. 4, 5, 6, 7, and 8 are details of the locking device.

In the several figures of the drawings the same letters of reference indicate corresponding parts.

This invention has relation to that class of mechanical devices known as "railway route-indicators," for informing passengers before they enter a railway-coach of the names of the cities, towns, and other stopping-places along the line of route through which the coach will pass in going from starting-point to final destination.

To this end my invention consists in the novel construction of a frame for holding route-indicating signs and in a novel form of locking device employed in connection therewith, whereby the indicating-signs can be readily inserted in the frame and safely and securely held in place during transit of the coach between termini, all as will now be more fully set out and explained, reference being had to the accompanying drawings, in which—

A designates the back plate, provided with a molded edge or frame, B. The back plate and frame can be made in a variety of forms and of any suitable material; also, they can be in separate parts or in one piece. The back plate, A, and frame B are permanently affixed to the outside of the coach at any convenient point. Usually the back plate, A, will have painted upon its front face, in such colors as taste and circumstances may suggest, some ornamental design, or the number of the coach—as 28, for example—so that the back plate may have an attractive appearance when not covered by a route-indicating sign or tablet, C.

In Figs. 2 and 3 the sign C, or tablet, is seen in place, covering the back plate and confined within the frame B, being held in place by means of an overlapping lip, $d$, at the top of the frame B and certain locking devices at or near the bottom of the same, located in notches $e\ e$, cut in the side of the frame.

The locking devices are a very important feature of my invention. Their construction is as follows: Plates $f\ f$ are firmly affixed to the outside of the frame B by means of screws. These plates cover the slots or notches $e\ e$, and make the periphery of the frame solid and continuous, excepting the centrally-located perforations $h$, from the peripheries of which are cut slots or notches $i$. On the back sides of the plates are tubes or sleeves $k$, the inner end of which fits on and connects with the rounded part of the perforations $h$. The sleeves $k$ have longitudinal slots $m$, to correspond with the slots $i$ of the perforations $h$ and slots $e$ on the frame B. Spindles $n$ are passed through the perforations $h$ and sleeves $k$. At or near their inner ends the spindles carry collars $o$, between which and the ends of the sleeves $k$ are confined spiral springs $p$. At their outer ends the spindles are provided with enlargements or handles $q$, of such form and shape as to be easily grasped with the fingers. Lips or lugs $r$ are formed each of a separate piece, and are fitted on the enlarged part $q$ of the spindle by means of the oblong slots $r'$ in said lips or lugs, so that they are moved with the spindle when it rotates, but not when it moves longitudinally. There may be on the outer edge of the slots a slight flange, $x$, as shown; but for all ordinary purposes this is not necessary, as this flange is quite as much for ornament as for any other purpose. The enlarged ends $q$ are so shaped that their upper edges, $q'$, fit into the slots $e$, $i$, $m$, and $r'$, like splines.

The operation of the device is very simple. When the operator desires to place a route-indicating tablet C in the frame B, he grasps the handles $q$, and pulls the spindles outwardly through the sleeves $k$, slots $r'$, and perforations $h$ till the enlarged parts $q'$ are disengaged from the slots $e$, $i$, $m$, and $r'$. The spindles are then rotated by twisting the wrists to throw the lips $r$ downward and away from the frame. (See Figs. 1 and 5.) The tablet C is then placed flat against the back plate and within the frame, care being taken to slip the upper edge of the tablet under the overlapping lip $d$. The spindles are then returned to their original position, the lips $r$ overlapping and confining the lower part of the tablet. The spindles are kept secure and prevented from moving longitudinally through the sleeves by reason of the elongating force of the spiral springs $p$, compressed between the collars $o$ and ends of the sleeves $k$. The engagement of the enlarged parts $q'$ of the spindle with the slots $e$, $i$, $m$, and $r'$ obviously secures the spindles and keeps them from turning in their places. To remove or change the tablets C, the general features of the operation above indicated obtain. To aid in this operation there may be provided a thumb-slot, $b$, in the lower edge of the frame.

The tablets C are intended to conform to the shape of the frame B. They can be made of any suitable material—such as tin, heavy paper, wood, &c. On one side I paint the names of the principal cities, towns, and stopping places through which the coach is expected to pass. On the other side I paint the same names in reverse order. Thus only one sign is necessary for a coach in making the round trip. The tablet is intended to remain in place from the station of first starting till the final destination is reached. When the coach starts on the return trip, the tablet is to be reversed, as above indicated. The tablet should be placed in some conspicuous place upon the outside of the coach, so that it can be read by every passenger before entering the coach, thus providing for the traveling public a sure means for preventing mistakes by getting into the wrong car. That the back plate and frame may not be unsightly objects when the tablets are not attached, I ornament the back plate with some fanciful design or picturesque scene. Practical use of the back plate can be made for displaying the number of the coach, as has been above stated. The frame B is intended to fit very close against the side of the coach, so that there shall be no danger of cinders, dust, water, ice, &c., working behind the back plate and clogging the operations of the locking devices. In case of damage to the locking arrangements the screws in the plates $ff$ can be withdrawn, when the locking devices can be taken off and repaired and then easily replaced.

The application of my newly-organized route-indicator is not confined to railway-coaches. It can be used with equally good results on horse-cars, omnibuses, at steamboat-landings, &c.—in fact, at all points where it is desirable to impart to travelers the names of the stopping-places on the line of route of the conveyance, whether by land or water.

What I claim as my invention, and desire to secure by Letters Patent, is—

1. In a route-indicating apparatus, the combination, with the back plate and frame, of longitudinally-movable and rotatable locking-spindles having a rotatable projecting lip and a spring, whereby the route-indicating tablet may be retained in its place by the lip, or the lip may be rotated out of its retaining position and held in a fixed position for the removal or adjustment of said tablet in place, substantially as described.

2. In a route-indicating apparatus, the combination of the frame B, provided with an overlapping lip, $d$, and notches $e$, apertured plates $f$, sleeves $k$, spindles $n$, lips $r$, and handles $q$, and confined springs $p$, as and for the purposes specified.

3. In a route-indicating apparatus, the combination, with a device for locking a route-indicating tablet in place, consisting of a locking-spindle carrying the lip $r$ and fitted through a perforated and slotted plate and slotted sleeve, and having an enlarged outer end shaped to engage with said slotted plate and sleeve, of a tablet and a spring adapted to keep said spindle in position, substantially as indicated.

In testimony that I claim the foregoing as my own I have affixed my signature in the presence of two witnesses.

JOHN B. MITCHELL.

Witnesses:
  CHAS. U. KNOWLTON,
  H. G. BRIGGS.